United States Patent
Lee et al.

(10) Patent No.: US 11,880,966 B2
(45) Date of Patent: Jan. 23, 2024

(54) IMAGE QUALITY ASSESSMENT APPARATUS AND IMAGE QUALITY ASSESSMENT METHOD THEREOF

(71) Applicant: Wistron Corporation, New Taipei (TW)

(72) Inventors: Yuan-Bin Lee, New Taipei (TW); Hsiao-Wen Tin, New Taipei (TW)

(73) Assignee: Wistron Corporation, New Taipei (TW)

( * ) Notice: Subject to any disclaimer, the term of this patent is extended or adjusted under 35 U.S.C. 154(b) by 295 days.

(21) Appl. No.: 17/022,086

(22) Filed: Sep. 16, 2020

(65) Prior Publication Data
US 2022/0036535 A1     Feb. 3, 2022

(30) Foreign Application Priority Data

Aug. 3, 2020 (TW) ................. 109126182

(51) Int. Cl.
*H04N 19/136* (2014.01)
*H04N 19/176* (2014.01)
*G06T 7/00* (2017.01)

(52) U.S. Cl.
CPC ......... *G06T 7/0002* (2013.01); *H04N 19/136* (2014.11); *H04N 19/176* (2014.11); *G06T 2207/10016* (2013.01); *G06T 2207/20081* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 6,900,911 B1 * | 5/2005 | Yamazaki | H04N 1/40 358/530 |
| 9,332,275 B2 | 5/2016 | Watanabe et al. | |
| 9,456,212 B2 | 9/2016 | Wan et al. | |
| 9,571,845 B2 | 2/2017 | Lee et al. | |
| 9,699,466 B2 | 7/2017 | Wu et al. | |
| 9,800,877 B2 | 10/2017 | Lee et al. | |
| 9,800,878 B2 | 10/2017 | Lee et al. | |
| 9,807,404 B2 | 10/2017 | Lee et al. | |

(Continued)

FOREIGN PATENT DOCUMENTS

| | | |
|---|---|---|
| CN | 100559880 | 11/2009 |
| CN | 104079925 | 10/2014 |

(Continued)

OTHER PUBLICATIONS

"Office Action of Europe Related Application, Application No. 20204027.5", dated Jan. 19, 2021, p. 1-p. 13.

(Continued)

*Primary Examiner* — Mohammad J Rahman
(74) *Attorney, Agent, or Firm* — JCIPRNET

(57) ABSTRACT

An image quality assessment apparatus and an image quality assessment method are provided. In the method, multiple to-be-assessed blocks are formed for an image in a video stream, these to-be-assessed blocks are inputted to a quality assessment model, and a quality of the image is determined according to an output result of the quality assessment model. The quality assessment model is trained based on a machine learning algorithm.

18 Claims, 3 Drawing Sheets

(56) References Cited

U.S. PATENT DOCUMENTS

| | | | |
|---|---|---|---|
| 9,807,405 B2 | 10/2017 | Lee et al. | |
| 10,134,110 B1* | 11/2018 | Liu | H04N 19/523 |
| 10,225,565 B2 | 3/2019 | Lee et al. | |
| 11,223,844 B2 | 1/2022 | Abe et al. | |
| 11,563,969 B2 | 1/2023 | Abe et al. | |
| 2002/0047919 A1* | 4/2002 | Kondo | H04N 7/012 |
| | | | 348/441 |
| 2006/0093036 A1* | 5/2006 | Park | H04N 19/33 |
| | | | 375/E7.031 |
| 2006/0204034 A1* | 9/2006 | Steinberg | G06V 10/10 |
| | | | 382/118 |
| 2006/0204057 A1* | 9/2006 | Steinberg | H04N 19/115 |
| | | | 382/103 |
| 2007/0110305 A1* | 5/2007 | Corcoran | G06T 5/001 |
| | | | 382/167 |
| 2009/0116759 A1* | 5/2009 | Suzuki | H04N 19/587 |
| | | | 382/238 |
| 2011/0249909 A1* | 10/2011 | Lee | G06T 5/002 |
| | | | 382/264 |
| 2012/0201475 A1* | 8/2012 | Carmel | H04N 19/40 |
| | | | 382/238 |
| 2012/0327998 A1 | 12/2012 | Nilsson et al. | |
| 2013/0343449 A1 | 12/2013 | Oishi | |
| 2014/0355678 A1 | 12/2014 | Watanabe et al. | |
| 2015/0023406 A1 | 1/2015 | Lee et al. | |
| 2015/0189271 A1 | 7/2015 | Wu et al. | |
| 2015/0334404 A1 | 11/2015 | Lee et al. | |
| 2015/0334408 A1 | 11/2015 | Lee et al. | |
| 2015/0334409 A1 | 11/2015 | Lee et al. | |
| 2015/0334410 A1 | 11/2015 | Lee et al. | |
| 2016/0156911 A1 | 6/2016 | Mitasaki et al. | |
| 2017/0019454 A1* | 1/2017 | Almohamedh | H04L 69/24 |
| 2018/0023956 A1* | 1/2018 | Chen | H04W 4/33 |
| | | | 701/524 |
| 2018/0027247 A1 | 1/2018 | Lee et al. | |
| 2019/0045195 A1 | 2/2019 | Gokhale et al. | |
| 2019/0132001 A1* | 5/2019 | Deng | H03M 7/6011 |
| 2020/0014950 A1 | 1/2020 | Abe et al. | |
| 2021/0049795 A1* | 2/2021 | Cao | G06T 7/11 |
| 2021/0195223 A1 | 6/2021 | Chang et al. | |
| 2021/0201147 A1* | 7/2021 | Tu | G06V 10/82 |
| 2021/0225040 A1 | 7/2021 | Park et al. | |
| 2022/0036535 A1* | 2/2022 | Lee | H04N 19/103 |
| 2022/0038747 A1* | 2/2022 | Lee | H04N 19/154 |
| 2022/0046266 A1 | 2/2022 | Abe et al. | |
| 2023/0107832 A1 | 4/2023 | Abe et al. | |
| 2023/0110758 A1 | 4/2023 | Abe et al. | |
| 2023/0118198 A1 | 4/2023 | Abe et al. | |
| 2023/0145558 A1 | 5/2023 | Abe et al. | |
| 2023/0156214 A1 | 5/2023 | Abe et al. | |

FOREIGN PATENT DOCUMENTS

| | | |
|---|---|---|
| CN | 104333756 | 2/2015 |
| CN | 104754337 | 7/2015 |
| CN | 106791828 | 5/2017 |
| CN | 103916675 | 6/2017 |
| CN | 108965892 | 12/2018 |
| CN | 110324618 | 10/2019 |
| CN | 110999303 | 4/2020 |
| EP | 1175058 | 1/2002 |
| EP | 3026909 | 6/2016 |
| JP | 2015027022 | 2/2015 |
| TW | 201921943 | 6/2019 |
| WO | 2013089129 | 6/2013 |

OTHER PUBLICATIONS

"Office Action of Taiwan Counterpart Application", Korea Institute Of Geoscience And Mineral Jun. 4, 2021, p. 1-p. 10.

"Office Action of Taiwan Related Application, application No. 109126181", dated May 28, 2021, p. 1-p. 10.

Santiago De-Luxan-Hernandez et al., "An Intra Subpartition Coding Mode for VVC", 2019 IEEE International Conference on Image Processing (ICIP), Sep. 22, 2019, pp. 1203-1207.

"Office Action of Japan Related Application, Application No. 2020-196826", Korea Institute Of Geoscience And Mineral Jan. 4, 2022, p. 1-p. 4.

"Office Action of U.S. Related U.S. Appl. No. 17/022,097", Korea Institute Of Geoscience And Mineral Jan. 27, 2022, pp. 1-23.

VCODEX, "SKIP macroblocks", Apr. 2010, Available at: https://www.vcodex.com/news/skip-macroblocks/.

"Office Action of U.S. Related Application, U.S. Appl. No. 17/022,097", Korea Institute Of Geoscience And Mineral Aug. 18, 2021, pp. 1-39.

"Office Action of China Counterpart Application", Korea Institute Of Geoscience And Mineral Nov. 14, 2022, p. 1-p. 11.

"Office Action of China Counterpart Application", Korea Institute Of Geoscience And Mineral Aug. 3, 2023, p. 1-p. 7.

* cited by examiner

IMAGE QUALITY ASSESSMENT APPARATUS AND IMAGE QUALITY ASSESSMENT METHOD THEREOF

CROSS-REFERENCE TO RELATED APPLICATION

This application claims the priority benefit of Taiwan application no. 109126182, filed on Aug. 3, 2020. The entirety of the above-mentioned patent application is hereby incorporated by reference herein and made a part of this specification.

TECHNICAL FIELD

The invention relates to an image analysis technology, and more particularly, to an image quality assessment apparatus and an image quality assessment method thereof.

BACKGROUND

In recent years, machine learning technology has achieved many notable results in many fields, especially in computer vision and image processing. However, a video coding based on machine learning is still in an initial stage. The video coding is the basis of VoIP, and its efficiency directly affects the user experience. Compared with other video applications such as background noise suppression, echo cancellation, and voice and facial recognition, the video coding is currently the fastest growing, and can be used to enhance or improve the quality of calls/videos through machine learning. It is worth noting that with the advent of the fifth-generation (5G) mobile communications era, after the emergence of mobile and efficient transmission requirements, the problem of image transmission quality is bound to be paid attention again, and the high-efficiency video coding is constantly trying to break through the limitations of network transmission.

In the application of long-distance voice conferences, VoIP can not only save costs, but also allow multiple people to talk online at the same time and provide an immersive meeting experience through various meeting tools (e.g., presentation tools, live streaming and the like). However, with the increase in the number of online users, the bandwidth demand of the network and the number of connections has relatively doubled, and the video and voice delay time is also difficult to control due to channel congestion. At this time, the quality of the meeting (e.g., quality of service (QoS)/quality of experience (QoE)) is often greatly reduced. VoIP is usually connected to the Internet via a wired network. However, in recent years, there has been an increasing demand to provide services via mobile communications (e.g., 4G or 5G mobile networks). Accordingly, the management and deployment of more resources not only increases costs, but sometimes becomes an impossible task (e.g., the bandwidth cannot exceed an upper limit in a mobile environment). With the advancement of video technology, especially the popularization of Ultra-High Definition (UHD) video, and UHD video needs to be accommodated in limited storage space and limited transmission bandwidth.

Accordingly, with the continuous increase of network bandwidth, the demand for real-time conference video services also increases. In the case of limited bandwidth or insufficient allocation, it is easy to cause network performance degradation such as packet transmission delay, jitter, or packet loss, resulting in poor quality of VoIP video. Therefore, how to maintain the quality of real-time video transmission is one of the problems that the industry expects to solve.

SUMMARY

In view of the above, embodiments of the invention provide an image quality assessment apparatus and an image quality assessment method thereof, which use a block analysis to understand user concerned parts with a visual experience taken into consideration. In this way, a subjective assessment result of video stream can be obtained and used as a basis for improving an encoding mechanism.

The image quality assessment method according to the embodiments of the invention includes (but not limited to) the following steps. Multiple to-be-assessed blocks are formed for an image in a video stream. These to-be-assessed blocks are inputted to a quality assessment model. A quality of the image is determined according to an output result of the quality assessment model. The quality assessment model is trained based on a machine learning algorithm.

The image quality assessment apparatus according to the embodiments of the invention includes (but not limited to) a communication transceiver and a processor. The communication transceiver is configured to receive an image. The processor is coupled to the communication transceiver, and configured to form multiple to-be-assessed blocks for the image in a video stream, input the to-be-assessed blocks to a quality assessment model, and determine a quality of the image according to an output result of the quality assessment model. The quality assessment model is trained based on a machine learning algorithm.

Based on the above, the image quality assessment apparatus and the image quality assessment method can analyze the to-be-assessed blocks through the quality assessment model trained by the machine learning algorithm to thereby determine the quality of the entire image. In this way, an assessment efficiency can be improved, and more assessment factors can be comprehensively analyzed by combining the advantages of learning algorithms.

To make the aforementioned more comprehensible, several embodiments accompanied with drawings are described in detail as follows.

DETAILED DESCRIPTION

Figure 1:
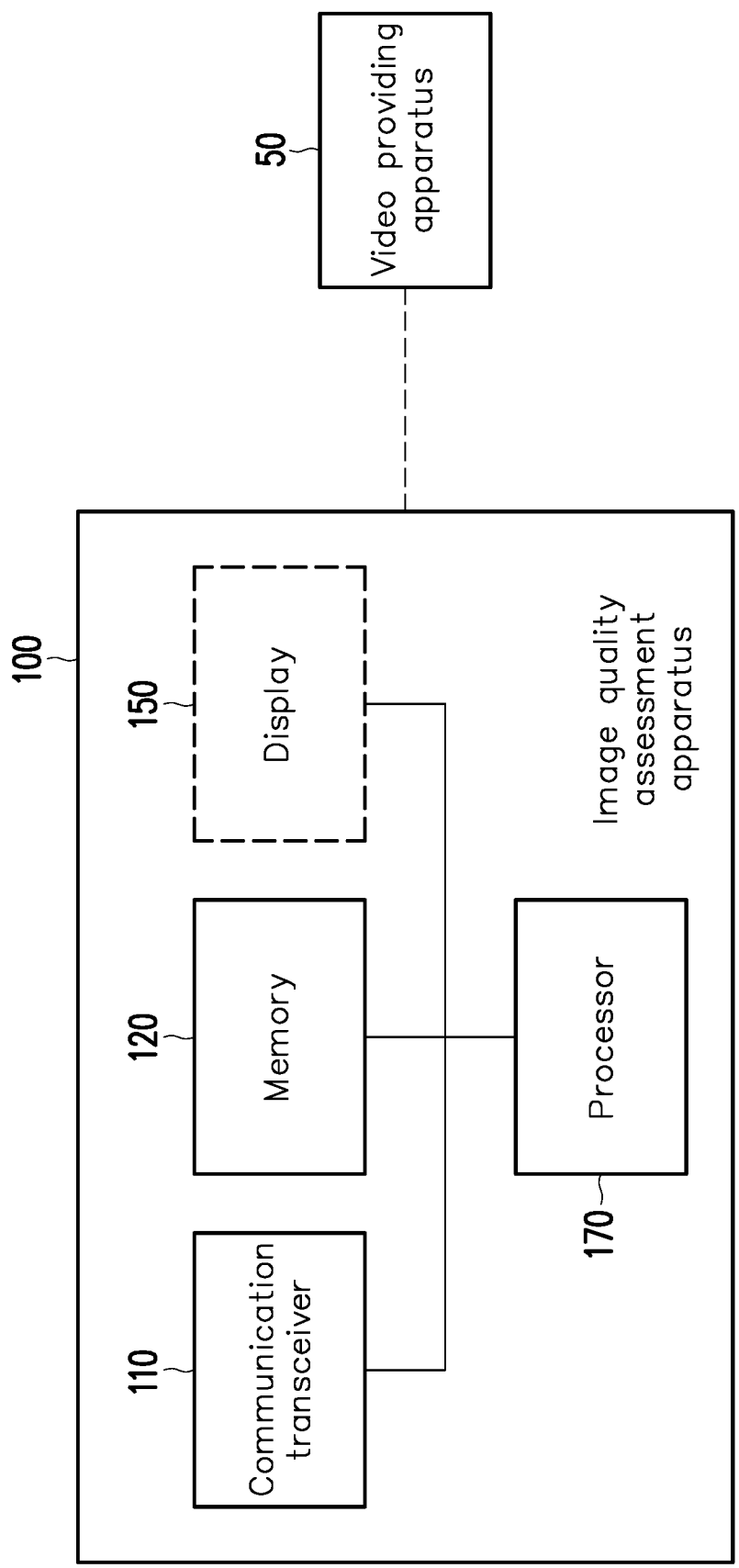
FIG. 1 is a block diagram of a video stream system according to an embodiment of the invention.

FIG. 1 is a block diagram of a video stream system 1 according to an embodiment of the invention. Referring to FIG. 1, a video stream system 1 includes (but not limited to) a video providing apparatus 50 and one or more image quality assessment apparatuses 100.

The video providing apparatus 50 may be a device such as a desktop computer, a notebook computer, a server, a cloud platform or a background host; or may also be a video playback device such as a video set-top box, or a smart TV; or may even be an image capturing device such as a video camera, or a camera. In an embodiment, the video providing apparatus 50 is configured to transmit a video stream (e.g., a video conference stream, a live stream, or a movie stream).

The image quality assessment apparatus 100 may be a device such as a desktop computer, a notebook computer, a smart phone, a smart TV, a tablet, or a set-top box. The image quality assessment apparatus 100 includes (but not limited to) a communication transceiver 110, a memory 120, a display 150 and a processor 170.

The communication transceiver 110 may be a transmitting circuit and a receiving circuit supporting Ethernet, an optical fiber network, a mobile network, Wi-Fi or other communication technologies. In an embodiment, the communication transceiver 110 is used to connect to the Internet or a local area network to transmit/receive data to/from the video providing apparatus 50.

The memory 120 may be a random access memory (RAM), a read only memory (ROM), a flash memory, a hard disk drive (HDD), a solid state drive (SSD) or other similar devices in any stationary or movable form, or a combination of the above-mentioned devices. In an embodiment, the memory 120 is used to store software modules, application programs and their code, and other temporary or permanent data or files (e.g., an image sequence, an image frame, encoding information, a video stream, a quality assessment model), and these data will be detailed in subsequent embodiments.

The display 150 may be a liquid crystal display (LCD), a light-emitting diode (LED) display, or an organic light-emitting diode (OLED). In an embodiment, the display 150 is used to display the image frame or a user interface. In certain embodiments, it is also possible that the image quality assessment apparatus 100 does not include the display 150.

The processor 170 may be a computing unit such as a central processing unit (CPU), a graphic processing unit (GPU), a micro control unit (MCU) or an application specific integrated circuits (ASIC). In an embodiment, the processor 170 is used to perform all operations of the image quality assessment apparatus 100, and can load in and execute the software modules or the application programs stored in the memory 120. Detailed operation regarding the same will be described in subsequent embodiments.

Hereinafter, various devices, components and modules in the video stream system 1 will be used to describe the method according to the embodiment of the invention. Each process may be adjusted based on the actual implementation, and the invention is not limited thereto.

Figure 2:
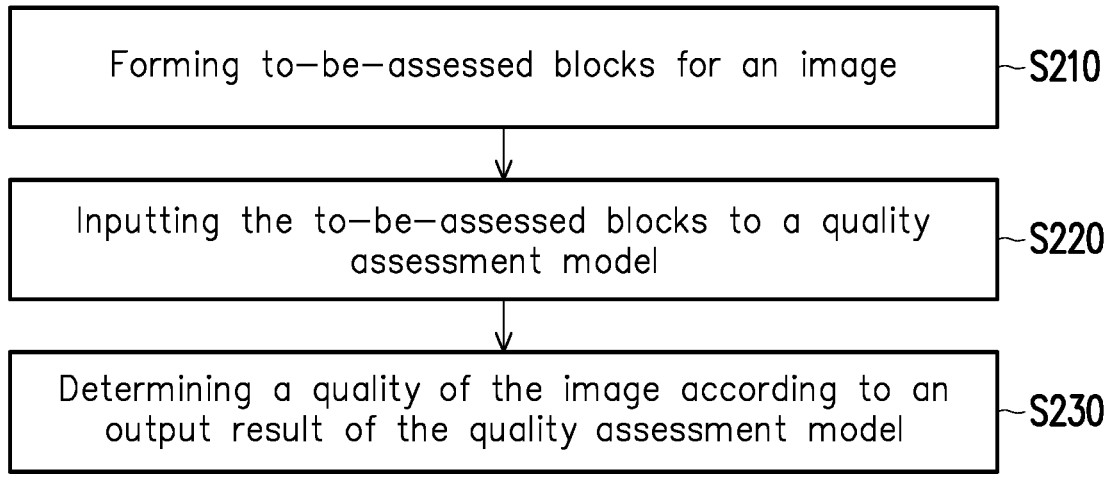
FIG. 2 is a flowchart of an image quality assessment method according to an embodiment of the invention.

FIG. 2 is a flowchart of an image quality assessment method according to an embodiment of the invention. Referring to FIG. 2, the processor 170 of the image quality assessment apparatus 100 receives the video stream from the video providing apparatus 50 through the communication transceiver 110, and forms a plurality of to-be-assessed blocks for an image in the video stream (step S210). Specifically, the video stream is, for example, a video stream encoded by high efficiency video coding (HEVC), advanced video coding (MPEG-4 Part 10; MPEG-4 AVC), or other coding standards. One or more image frames in an initial image sequence will be further divided into one or more processing units (e.g., coding tree unit (CTU), macroblocks or other basic encoding units). Each of the processing units may be further divided into one or more encoding units correspondingly. Each of the encoding units is used to record encoding information (e.g., encoding mode, brightness, color, or syntax) of a belonging block. Encoding results of those processing units can form the video stream.

It should be noted that, unlike the traditional technique for the image quality assessment on all pixels of the entire image, the embodiment of the invention uses the block as a basic unit for assessment. The to-be-assessed block may have a unit size of aforesaid encoding unit, a sub-encoding unit divided from the encoding unit (e.g., a transform unit (TU) of HEVC or a block of other encoding standards), or other sizes. The processor 170 can decode the video stream to reconstruct the image frame, and divided the reconstructed image frame into the to-be-assessed blocks.

The processor 170 can input the to-be-assessed blocks to a quality assessment model (step S220). Specifically, the quality assessment model is trained based on a machine learning algorithm. The machine learning algorithm can be a capsule network (CapsNet), a convolutional neural network (CNN), a dense convolutional network (DenseNet), or other algorithms.

With the capsule network taken as an example, its difference from CNN in image recognition is that a concept close to biological neural organization is used. When a viewpoint changes, there are a linear effect at the part or the object and nonlinear effects at the pixel. The capsule network has vectors with orientation, and can perform a feature detection based on statistical information. For example, "cat" can be identified based on facial features. In addition, the capsule network can also comprehend the features. For example, if the facial features are not in their specific area (e.g., the mouth is on the forehead, or the eyes are above the ears), the capsule network can detect a different orientation (e.g., a clockwise rotation) of the object, so as to know that the object can only be called "cat" if the facial features are at specific locations.

Figure 3:
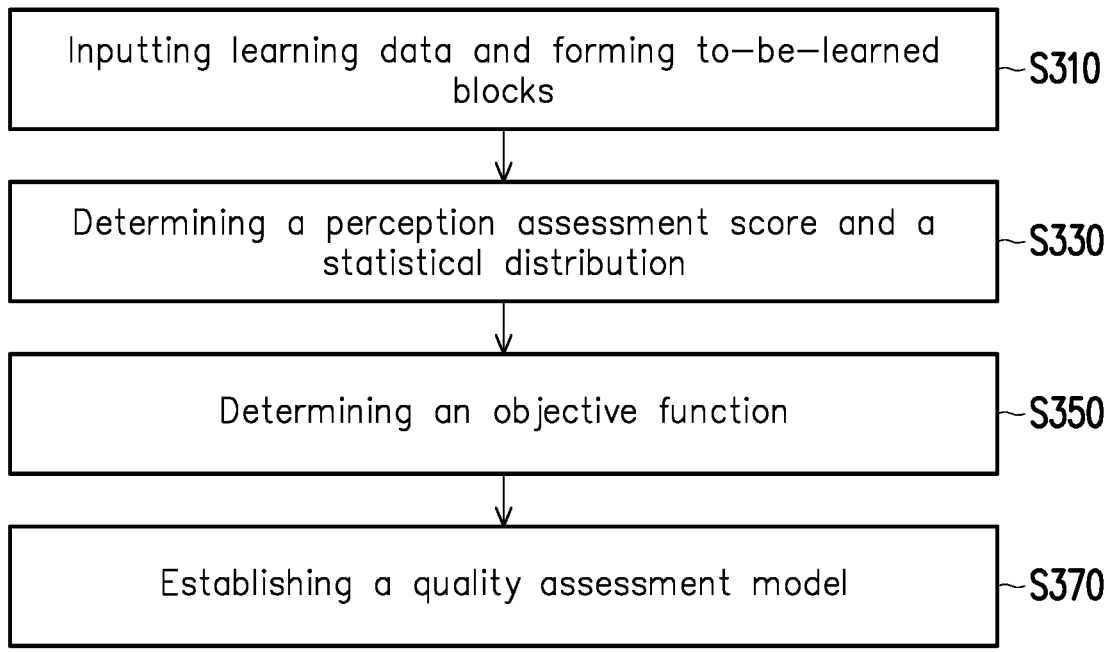
FIG. 3 is a flowchart of a training method of the image quality assessment model according to an embodiment of the invention.

FIG. 3 is a flowchart of a training method of the image quality assessment model according to an embodiment of the invention. Referring to FIG. 3, in an embodiment, the processor 170 can divide scene images (e.g., video conference images in conference room or office, or live streaming images) into a plurality of to-be-learned blocks, use those to-be-learned blocks in these scene images as learning data (step S310), and use the learning data as a training sample for training the quality assessment model. For example, if a meeting image is used as the scene image, human face in the image can be used as important information after the quality assessment model is trained. That is to say, image features are obtained and used as the region of interest for human face. The image features refer to features of a local image that can be learned from the to-be-learned blocks after the to-be-learned blocks are input to the neural network of the machine learning algorithm. The features are, for example, texture and gradient information. In the capsule network, the texture and gradient information and relative position information can be recorded as vectors. In addition, the function of the capsule network can ensure that the position of the important information is correct, so that the important information can be easily identified.

In an embodiment, the processor 170 can use data in mean opinion score (MOS) or differential mean opinion score (DMOS) image database as the learning data, divide the image in the learning data into the to-be-learned blocks, and use these to-be-learned blocks as a learning sample for training the quality assessment model.

The processor 170 can determine a perception assessment score and a statistical distribution (step S330). In an embodiment, the processor 170 may count perception assessment scores of a subjective assessment by one or more persons on those to-be-learned blocks. This kind of human visual assessment score is based on an actual rating result of human perception. With a standardized ITU (International Telecommunication Union) test taken as an example, the ITU test is divided into many stages and composed of at least 15 observers. The observers are required to rate the to-be-learned blocks with a score from 1 to 5. Each person may have a different subjective rating standard for the image quality, so that different persons usually give different scores. The score given by each observer depends on her/his own experiences and preferences, and may even vary according to the mood and things of the day. The processor 170 can use the perception assessment scores corresponding to these to-be-learned blocks as the training sample for training the quality assessment model. By inputting the perception assessment scores of the blocks to the neural network of the machine learning algorithm, the quality assessment model can be established, and the quality assessment model can then be used to infer the video stream in other contexts. In certain embodiments, the processor 170 can use rating results in the MOS or DMOS database as the perception assessment scores and thereby train the quality assessment model.

In addition, a natural scene statistics (NSS) model can describe statistical properties of the natural image. In another embodiment, the processor 170 can determine statistical distributions of the entire image correlated with a natural image. divide the image into smaller assessment blocks, and use wavelet or Laplace to calculate the statistical distribution of each assessment block to identify a feature value of each assessment block. The statistical distribution is correlated with a natural image statistical distribution. By determining the statistical distributions of the entire image and then dividing it into blocks, the processor 170 can know whether the assessment block includes an important feature. For example, it is assumed that human face is very important. Among the statistical distributions of the entire image, the statistical distribution corresponding to human face will show the important feature. Even though the divided assessment block is an eye, the statistical distribution corresponding to the eye among the statistical distributions of the entire image can still indicate that this assessment block is important (i.e., because the statistical distribution of human face of the entire image indicates that the eye is a part of the statistical human face, the eye in the divided assessment block may be determined as the important feature through the statistical distribution corresponding to the eye). The feature values of these assessment blocks can be used as a confirmation of a feature extraction in the encoding process. In some embodiments, the scene image can also be divided into smaller assessment blocks, and wavelet or Laplace is used to calculate the statistical distribution of each assessment block to perform an NSS regularity assessment.

The processor 170 can determine an objective function (step S350). In an embodiment, the processor 170 can determine one of multiple objective functions according to the image feature, the perception assessment score, and the statistical distribution corresponding to the to-be-learned blocks, and use the to-be-learned blocks and the objective function as the training sample for training the quality assessment model. Specifically, the objective function may be a fitness function of particle swarm optimization (PSO), a cost function calculation of fuzzy decision, or other optimization functions. These objective functions each have an upper limit and a lower limit. That is to say, an optimal solution of the objective function changes within a feasible region (a.k.a. a tolerance range) between the upper limit and the lower limit. In the process of encoding and decoding the image sequence, the reduction or loss of information is unavoidable. Therefore, the solution of the objective function can be obtained within an interval, and the upper limit and the lower limit of the objective function aim to allow the image quality to be improved or reduced within a certain tolerance range. The main goal is to find the optimal solution (i.e., the same image quality as the corresponding block of the original image), followed by finding other relevant feasible solutions (the image quality improved or reduced within the tolerance range).

Taking the image feature, the perception assessment score and the statistical distribution as parameters of the objective function as an example:

$$\min\_f = \min \text{block}(t,m,n) \tag{1}$$

$$\max\_f = \max \text{block}(t,m,n) \tag{2}$$

The objective function block(t,m,n) includes the image feature t, the perception assessment score m and the statistical distribution n. max_f represents the upper limit and min_f represents the lower limit. That is to say, a solution target can vary between the upper limit max_f and the lower limit min_f.

It should be noted that equations (1) and (2) are merely illustrative examples, and other embodiments may use any one of the image feature, the perception assessment score, and the statistical distribution as the parameters of the objective function.

After the neural network of the machine learning algorithm is trained, the quality assessment model can be established (step S370). The quality assessment model can be used to classify or identify the specific image feature, the perception assessment score, the statistical distribution, and/or the objective function of the to-be-assessed block.

Figure 4:
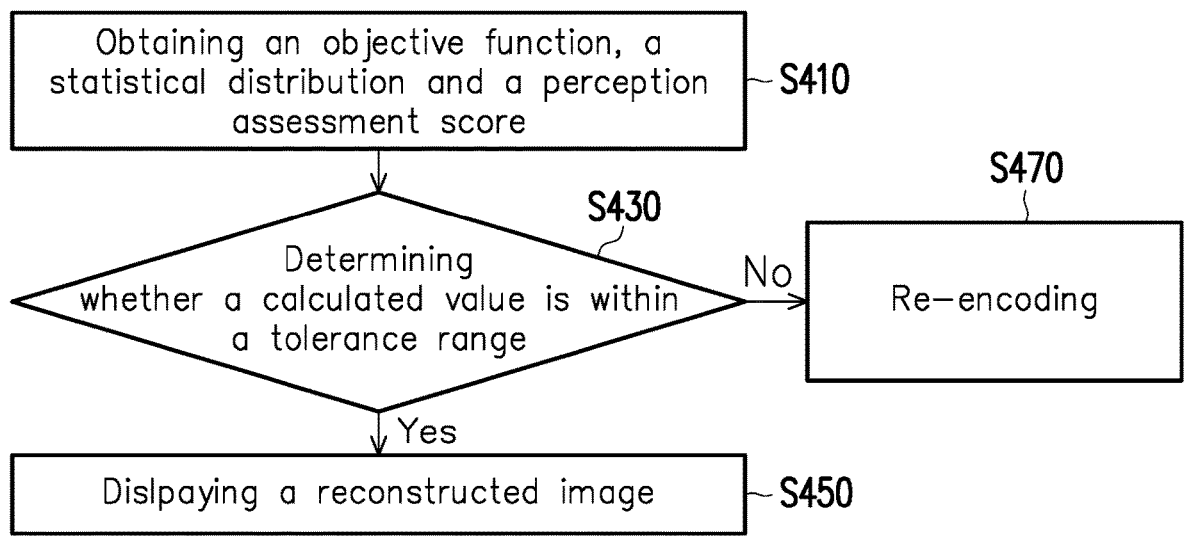
FIG. 4 is a flowchart of an inference method of the image quality assessment model according to an embodiment of the invention.

Referring back to FIG. 2, the processor 170 can determine a quality of the image according to an output result of the quality assessment model (step S230). Specifically, the trained quality assessment model can use the to-be-assessed blocks as the input data and accordingly infer the corresponding result. FIG. 4 is a flowchart of an inference method of the image quality assessment model according to an embodiment of the invention. Referring to FIG. 4, in an embodiment, if the image feature, the perception assessment score, the statistical distribution and the objective function of the scene image and/or training data are used as the learning data of the quality assessment model, the output result of the quality assessment model can include the specific image feature, the perception assessment score, the statistical distribution and the objective function (i.e., the image feature, the perception assessment score, the statistical distribution, and the objective function are obtained (step S410)). For example, the quality assessment model extracts the image features from the to-be-assessed block in the reconstructed image frame of the video stream, identifies the block corresponding to a type (e.g., human face, eyes, or mouth) to which the image feature belongs, and correspondingly obtains the perception assessment score, the statistical distribution and objective function according to the block of such type.

Then, the processor 170 can determine a calculated value of the objective function corresponding to each of the to-be-assessed blocks according to the image feature, the perception assessment score, the statistical distribution and the objective function in the output result (i.e., the calculated value of the corresponding to-be-assessed block is determined according to all of the image feature, the perception assessment score and the statistical distribution). The processor 170 can determine the quality of the corresponding to-be-assessed block based on this calculated value. That is to say, the calculated value is an index of the image quality.

In an embodiment, the processor 170 can determine whether the calculated value is between the upper limit and the lower limit (i.e., the tolerance range) of the corresponding objective function (step S430). If the calculated value is within the upper limit and the lower limit of the optimal solution, it means that a perception acceptance of the user on the to-be-assessed block is within the tolerance range (the difference represents a tolerance, and the upper and lower limits of the optimal solution can be modified through experience or dynamically), and the reconstructed image frame (i.e., the image frame of the decoded the video stream) can be further played through the display 150 (step S450). If the calculated value is not within the upper limit and the lower limit or has no solution, it means that the objective function cannot reach the optimal solution, the perception acceptance of the user on the to-be-assessed block is not within the tolerance range, or a frame distortion has occurred. Accordingly, a request for re-encoding the image (the display 150 does not play the reconstructed image frame) can be sent through the communication transceiver 110 (step S470). If the calculated value is equal to the optimal solution, it means that the to-be-assessed block can meet QoS or OoE, and the reconstructed image frame can be further played through the display 150.

In another embodiment, if the image feature, the perception assessment score and the objective function of the scene image and/or the training data are used as the learning data of the quality assessment model, the output result of the quality assessment model can include the specific image feature, the perception assessment score and the objective function (the objective function is formed according to the image feature and the perception assessment score in this embodiment). Then, the processor 170 can input the image feature and the perception assessment score in the output result to the objective function in the output result, determine the calculated value of the objective function corresponding to each of the to-be-assessed blocks (i.e., determine the calculated value corresponding to the to-be-assessed block according to the image feature and the perception assessment score), and use the calculated value as the index of the image quality.

In yet another embodiment, if the image feature, the statistical distribution and the objective function of the scene image and/or the training data are used as the learning data of the quality assessment model, the output result of the quality assessment model can include the specific image feature, the statistical distribution and the objective function (the objective function is formed according to the image feature and the statistical distribution in this embodiment). Then, the processor 170 can input the image feature and the statistical distribution in the output result to the objective function in the output result, determine the calculated value of the objective function corresponding to each of the to-be-assessed blocks (i.e., determine the calculated value corresponding to the to-be-assessed block according to the image feature and the statistical distribution), and use the calculated value as the index of the image quality.

Since a pixel distribution in the image frame is not a uniform distribution, one single to-be-assessed block in the image frame may not reflect all the pixels in the entire image frame, and the degree of attention of the user to each of the to-be-assessed blocks may also be different. In general, the important information (e.g., the people in the conference room are more important than the background of the conference room) or information that changes a lot (e.g., switching of scenes or changing of speakers) is the part that users pay attention to.

In order to consider the influence of different to-be-assessed blocks on the image quality assessment, the embodiment of the invention uses encoding levels as weights for the weighted average of the to-be-assessed blocks. The processor 170 can determine the encoding level of each of the to-be-assessed blocks, and the different encoding levels correspond to different weights. For example, the processor 170 determines the encoding level based on the output image feature. An encoding level b3 (which may be an edge pixel of the image frame, and has the largest intra pixel difference), an encoding level b2 (which may has a rougher texture and the second largest intra pixel difference), and an encoding level b1 (with the smallest intra pixel difference) correspond to weights w3, w2, and w1, respectively. Compared with the encoding level b1, the encoding level b3 can make the user pay more attention, so a value of the weight w3 is greater than a value of the weight w 1. That is to say, the higher the encoding level, the higher the value of the weight. Conversely, the lower the coding level, the lower the value of the weight. The processor 170 can determine a quality of the entire image frame according to qualities of the to-be-assessed blocks (e.g., the calculated values described above) and the corresponding weights.

A calculation formula for the quality of the image frame is as follows:

$$Q = \frac{\sum_{k=1}^{L} q_k w_k}{\sum_{k=1}^{L} w_k} \quad (5)$$

Q is the quality of the entire image frame; $q_k$ is the quality of a k-th to-be-assessed block; $w_k$ is the weight of the k-th to-be-assessed block; it is assumed that the image frame is divided into L to-be-assessed blocks, and L is a positive integer.

With the image frame divided into three to-be-assessed blocks taken as an example, the weights corresponding to the encoding levels b3, b2, and b1 are 60%, 30%, and 10%, respectively. The quality of the entire image frame is $(q_1*0.6+q_2*0.3+q_3*0.1)/(0.6+0.3+0.1)$. It should be noted that the values of the weights are merely illustrative, and the values may be set by the designer according to requirements or may be automatically set by the processor 170.

In certain embodiments, the processor 170 can select only the to-be-assessed blocks having the higher encoding level (i.e., a larger pixel difference), and use an average calculated value of the selected to-be-assessed blocks as a reference for the quality of the entire image.

It should be noted that if a score of the image quality is based on DMOS or MOS, the higher the DMOS score, the worse the quality; or the higher the MOS score, the higher the quality.

In addition, if a feedback regarding poor quality is obtained, the image quality assessment apparatus 100 can return an image quality assessment result to request the video providing apparatus 50 to change the encoding mechanism. In an embodiment, the video providing apparatus 50 further changes the encoding level to be encoded according to the quality of the image (e.g., the quality of the entire image frame or the qualities of a part of the to-be-assessed blocks). For example, if the image quality is poor (the calculated value is not within the tolerance range), the video providing apparatus 50 will request a decrease on the encoding level of the block to obtain more coding information (originally, only the blocks with the higher encoding level among multiple blocks are encoded, whereas the blocks with the lower encoding level are not encoded; other predicted values are referenced to conduct the reconstruction when decoding), and re-encode the blocks.

In another embodiment, the video providing apparatus 50 can change the determination for an encoding block according to the quality of the image. If the image quality is poor, the video providing apparatus 50 can extend the limitation for determining a size of the encoding block in the encoding process. For example, the video providing apparatus 50 can reduce the size of the encoding block to increase the detailed information, thereby improving an encoding quality.

In summary, the image quality assessment apparatus and the image quality assessment method according to the embodiments of the invention adopt the concept of no-reference (NR) image quality assessment, which does not require a comparison of reference images nor to extract the image features for all pixels in the image. With reference to the NSS statistical features, the neural network of the machine learning algorithm of the embodiment of the invention extracts the image features of the to-be-assessed blocks, and uses the encoding level to weight the pixels of the to-be-assessed block, thereby performing the quality assessment on the entire image. The image quality assessment can be further fed back to the encoding mechanism, so that the adjusted encoding mechanism can meet the needs of human visual perception.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. An image quality assessment method, comprising:
   forming a plurality of to-be-assessed blocks for an image;
   inputting the to-be-assessed blocks to a quality assessment model, wherein the quality assessment model is trained based on a machine learning algorithm; and
   determining a quality of the image according to an output result of the quality assessment model,
   the step of determining the quality of the image according to the output result of the quality assessment model comprises:
      determining an encoding level of each of the to-be-assessed blocks, wherein the different encoding levels correspond to different weights, the encoding level of the to-be-assessed blocks with larger intra pixel difference corresponds to the weight with higher value; and
      determining the quality of the image according to qualities of the to-be-assessed blocks and the corresponding weights by following calculation formula:

$$Q = \frac{\sum_{k=1}^{L} q_k w_k}{\sum_{k=1}^{L} w_k}$$

wherein Q is the quality of the image, $q_k$ is the quality of a k-th to-be-assessed block, $w_k$ is the weight of the k-th to-be-assessed block, L is total number of the to-be-assessed blocks.

2. The image quality assessment method of claim 1, wherein the output result of quality assessment model comprises one of a plurality of objective functions, and the step of determining the quality of the image according to the output result of the quality assessment model comprises:
   determining a calculated value of the objective function corresponding to each of the to-be-assessed blocks; and
   determining a quality corresponding to the to-be-assessed block according to the calculated value,
   wherein the output result of the quality assessment model further comprises at least one of an image feature, a perception assessment score and a statistical distribution of the to-be-assessed block.

3. The image quality assessment method of claim 2, wherein the statistical distribution is correlated with a natural image statistical distribution, and the step of determining the calculated value of the objective function corresponding to each of the to-be-assessed blocks comprises:
   determining a calculated value corresponding to each of the to-be-assessed blocks according to the statistical distribution.

4. The image quality assessment method of claim 2, wherein the perception assessment score is obtained based on an actual rating result of human perception, a mean opinion score (MOS) database or a differential mean opinion score (DMOS) database, and the step of determining the calculated value of the objective function corresponding to each of the to-be-assessed blocks comprises:
   determining a calculated value corresponding to each of the to-be-assessed blocks according to the perception assessment score.

5. The image quality assessment method of claim 2, wherein each of the objective functions has an upper limit and a lower limit, and the step of determining the quality corresponding to the to-be-assessed block according to the calculated value comprises:
   determining whether the calculated value is between the upper limit and the lower limit of the corresponding objective function.

6. The image quality assessment method of claim 5, wherein after determining whether the calculated value is between the upper limit and the lower limit of the corresponding objective function, the method further comprises:
   in response to the calculated value being between the upper limit and the lower limit, playing the image; and
   in response to the calculated value not being between the upper limit and the lower limit or not having a solution, not playing the image.

7. The image quality assessment method of claim 1, further comprising:
   using a plurality of to-be-learned blocks in at least one scene image, a mean opinion score image database or a differential mean opinion score image database as learning data; and
   using the learning data as a training sample for training the quality assessment model, wherein
      perception assessment scores of a subjective assessment of the to-be-learned blocks are counted; and
      the perception assessment scores corresponding to the to-be-learned blocks are used as the training sample for training the quality assessment model.

8. The image quality assessment method of claim 1, further comprising:
determining one of a plurality of objective functions according to at least one of an image feature, a perception assessment score and a statistical distribution corresponding to a plurality of to-be-learned blocks, and using the plurality of to-be-learned blocks and the objective function as a training sample for training the quality assessment model.

9. The image quality assessment method of claim 1, further comprising:
re-encoding the image according to the quality of the image.

10. An image quality assessment apparatus, comprising:
a communication transceiver, configured to receive an image; and
a processor, coupled to the communication transceiver, and configured to:
form a plurality of to-be-assessed blocks for the image;
input the to-be-assessed blocks to a quality assessment model, wherein the quality assessment model is trained based on a machine learning algorithm;
determine a quality of the image according to an output result of the quality assessment model,
determine an encoding level of each of the to-be-assessed blocks, wherein the different encoding levels correspond to different weights, the encoding level of the to-be-assessed blocks with larger intra pixel difference corresponds to the weight with higher value; and
determine the quality of the image according to qualities of the to-be-assessed blocks and the corresponding weights by following calculation formula:

$$Q = \frac{\sum_{k=1}^{L} q_k w_k}{\sum_{k=1}^{L} w_k}$$

wherein Q is the quality of the image, $q_k$ is the quality of a k-th to-be-assessed block, $w_k$ is the weight of the k-th to-be-assessed block, L is total number of the to-be-assessed blocks.

11. The image quality assessment apparatus of claim 10, wherein the output result of quality assessment model comprises one of a plurality of objective functions, and the processor is further configured to:
determine a calculated value of the objective function corresponding to each of the to-be-assessed blocks; and
determine a quality corresponding to the to-be-assessed block according to the calculated value,
wherein the output result of the quality assessment model further comprises at least one of an image feature, a perception assessment score and a statistical distribution of the to-be-assessed block.

12. The image quality assessment apparatus of claim 11, wherein the statistical distribution is correlated with a natural image statistical distribution, and the processor is further configured to:
determine a calculated value corresponding to each of the to-be-assessed blocks according to the statistical distribution.

13. The image quality assessment apparatus of claim 11, wherein the perception assessment score is obtained based on an actual rating result of human perception, a mean opinion score database or a differential mean opinion score database, and the processor is further configured to:
determine a calculated value corresponding to each of the to-be-assessed blocks according to the perception assessment score.

14. The image quality assessment apparatus of claim 11, wherein each of the objective functions has an upper limit and a lower limit, and the processor is further configured to:
determine whether the calculated value is between the upper limit and the lower limit of the corresponding objective function.

15. The image quality assessment apparatus of claim 14, further comprising:
a display, coupled to the processor, wherein the processor is configured to:
in response to the calculated value being between the upper limit and the lower limit, play the image through the display; and
in response to the calculated value not being between the upper limit and the lower limit or not having a solution, not play the image through the display.

16. The image quality assessment apparatus of claim 10, wherein the processor is further configured to:
use a plurality of to-be-learned blocks in at least one scene image, a mean opinion score image database or a differential mean opinion score image database as learning data; and
use the learning data as a training sample for training the quality assessment model, wherein
perception assessment scores of a subjective assessment of the to-be-learned blocks are counted; and
the perception assessment scores corresponding to the to-be-learned blocks are used as the training sample for training the quality assessment model.

17. The image quality assessment apparatus of claim 10, wherein the processor is further configured to:
determine one of a plurality of objective functions according to at least one of an image feature, a perception assessment score and a statistical distribution corresponding to a plurality of to-be-learned blocks, and using the plurality of to-be-learned blocks and the objective function as a training sample for training the quality assessment model.

18. The image quality assessment apparatus of claim 10, wherein the processor is further configured to:
send a request for re-encoding the image through the communication transceiver according to the quality of the image.

* * * * *